United States Patent [19]

Sauder et al.

[11] Patent Number: 4,995,527
[45] Date of Patent: Feb. 26, 1991

[54] BREAKOUT PANEL FOR MOLDINGS

[75] Inventors: John A. Sauder, Watauga; Harold Larson, Hurst, both of Tex.

[73] Assignee: Tandy Corporation, Fort Worth, Tex.

[21] Appl. No.: 360,498

[22] Filed: Jun. 2, 1989

[51] Int. Cl.[5] .............................................. H02G 3/00
[52] U.S. Cl. ...................................... 220/266; 220/3.2
[58] Field of Search .......................... 220/266, 276, 3.2

[56] References Cited

U.S. PATENT DOCUMENTS

| | | | |
|---|---|---|---|
| 3,773,968 | 11/1973 | Copp | 220/266 X |
| 3,873,759 | 3/1975 | Schindler et al. | 220/3.2 X |
| 3,926,330 | 12/1975 | Deming et al. | 220/266 X |
| 4,071,159 | 1/1978 | Robinson et al. | 220/3.2 |
| 4,244,483 | 1/1981 | Bauer et al. | 220/3.2 |
| 4,281,773 | 8/1981 | Mengeu | 220/3.2 |
| 4,366,343 | 12/1982 | Slater et al. | 220/3.2 X |
| 4,821,904 | 4/1989 | Bhargava et al. | 220/3.2 |

Primary Examiner—Steven M. Pollard
Attorney, Agent, or Firm—Townsend and Townsend

[57] ABSTRACT

A breakout panel (6) is situated within a breakout opening (8) in a molded part (2). The breakout panel and opening define circumferentially extending corners (16, 18) positioned adjacent one another. The two corners touch at a line of intersection (21) having substantially no width to create a zero landed intersecting edge. Physical connection between the breakout panel and the body is provided by several small frangible pads (22) at the line of intersection. The frangible pads are sized to permit the breakout panel to be broken away from the body in a frangible manner to expose the breakout opening. The frangible pad intersects the body along the inside surface (20) of the body so that when the breakout panel is broken away, the resulting scars (38) at the locations of the frangible pads are not visible from the outside of the part. Further, this leaves the wall (10) defining the breakout opening free from scar material to provide excellent cosmetic appearance and eliminate any need to trim away scar material.

12 Claims, 1 Drawing Sheet

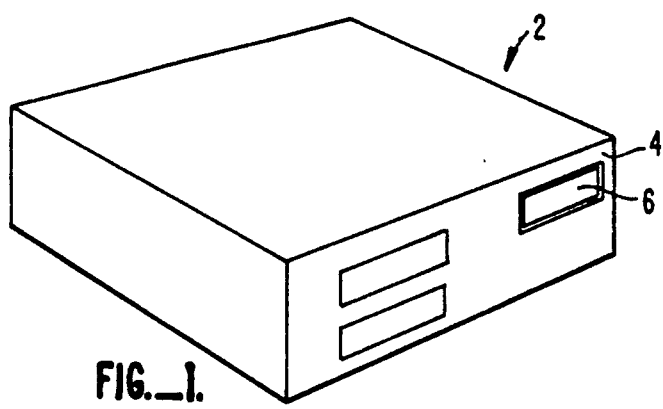
FIG._1.
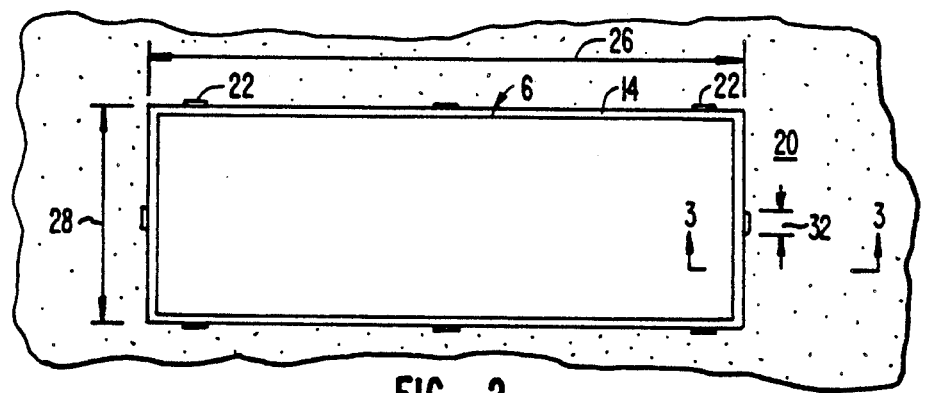
FIG._2.
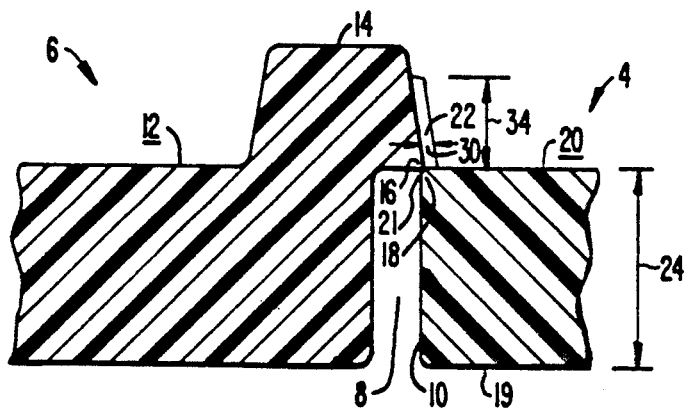
FIG._3.
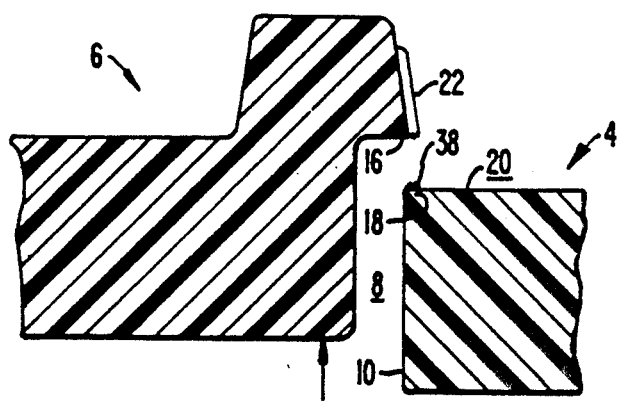
FIG._4.

BREAKOUT PANEL FOR MOLDINGS

BACKGROUND OF THE INVENTION

Many products use various types of breakout plugs and panels for various purposes. For example, many electrical outlet boxes have circular breakout plugs which can be removed to permit passage of wire or cable through the wall of the box. Also, many electronic products have breakout panels which can be removed to permit installation of an additional accessory; additional disk drives are often mounted within a personal computer housing after a breakout panel has been removed.

One of the problems with conventional breakout panels and plugs is that the frangible portions connecting the panel or plug with the surrounding body create unsightly scars where the frangible material has ruptured or separated. In addition, this scar material often extends into the opening created by the removal of the breakout panel and often must be removed prior to further use.

SUMMARY OF THE INVENTION

The present invention is directed to a molded part including a body and a breakout element, such as a breakout panel or plug, which substantially seals the opening but is easily removed. Further, the invention provides that when the breakout panel is removed, no scar material is visible for enhanced cosmetic appearance and the elimination of the need to remove scar material from the wall defining the opening created by the removal of the breakout panel.

The breakout panel is situated within a breakout opening in the body. Preferably the breakout panel has a corner extending completely around its periphery. Similarly, the wall defining the opening preferably has a circumferentially extending corner; the corners are positioned so they are adjacent one another. The two corners touch at a line of intersection having substantially no width to create what is termed a zero landed intersecting edge. This permits the breakout panel to substantially seal the opening while permitting the adjacent edges to separate easily when the breakout panel is removed.

Physical connection between the breakout panel and the body is provided by several small frangible pads, preferably at the line of intersection. The frangible pads are sized to permit the breakout panel to be broken away from the body in a frangible manner to expose the breakout opening. The frangible pads intersect the body along the inside surface of the body so that when the breakout panel is broken away, the resulting scars at the locations of the frangible pads are not visible from the outside of the part. Further, since the wall defining the breakout opening in the body is free from scar material, the need to trim scar material from the wall of the breakout opening is eliminated.

One of the primary advantages of the invention is that the part can be molded, typically by injection molding, as a one piece part in a manner which permits the opening to be substantially sealed by an easily removed breakout panel and which eliminates any visible ragged edge or scar created by separation of the frangible pads.

Other features and advantages of the invention will appear from the following description in which the preferred embodiment has been set forth in detail in conjunction with the accompanying drawings.

BRIEF DESCRIPTION OF THE DRAWINGS

FIG. 1 is a simplified isometric view of a computer housing including a front panel with a breakout panel made according to the invention.

FIG. 2 is an enlarged elevational view of the breakout panel of FIG. 1 as viewed from the inside of the computer housing.

FIG. 3 is a greatly enlarged cross-sectional view taken along line 3—3 of FIG. 2.

FIG. 4 is a view similar to FIG. 3 showing the separation of breakout panel from the front panel and illustrating the hidden location of the resulting scar at an inside surface of the front panel.

DETAILED DESCRIPTION OF THE PREFERRED EMBODIMENT

Turning now to FIG. 1, a computer housing 2 is shown to include a front panel 4 having a breakout panel 6 made according to the invention. Referring now also to FIGS. 2 and 3, breakout panel 6 is shown to be positioned within an opening 8 in front panel 4, opening 8 defined by a circumferential interior wall 10. Panel 6 includes an inside surface 12 having a circumferential rim 14 extending towards the inside of computer housing 2. Rim 14 of breakout panel 6 has a circumferentially extending corner 16 opposite a like circumferentially extending corner 18 of front panel 4. Front panel 4 has an outside surface 19 and an inside surface 20 joined by wall 10. Corner 18 is positioned at the intersection of wall 10 and inside surface 20. Corners 16, 18 meet along a line of intersection 21 having a finite length but substantially no width. This creates what is termed a zero landed intersecting edge since there is no substantial landing at the intersection of corners 16, 18.

Breakout panel 6 is supported within opening 8 formed in front panel 4 by a number of frangible pads 22. Pads 22 are integrally formed with panels 4, 6 and thus connect rim 14 with inside surface 20 of front panel 4. Pads 22 are sized to maximize the flow of material between front panel 4 and breakout panel 6 during injection molding operations while minimizing the size of the pads to permit breakout panels to separate with an appropriate amount of force. In one example front panel 4 has a thickness 24 of about 0.12 inch while breakout panel 6 has a length 26 of about 6 inches and a height 28 of about 1.62 inches. Housing 2 includes eight frangible pads 22, each having a thickness 30 of about 0.015 inch, a length 32 of about 0.10 inch and a height 34 of about 0.05 inch. Using PVC as the molding material has proven successful. The exact number and dimensions will vary upon the size of breakout panel 6, the particular material used, the amount of force which can be exerted, and other such factors.

To remove breakout panel 6 from front panel 4, one forces breakout panel 6 into the interior of computer housing 2. This causes frangible pads 22 to fail as suggested in FIG. leaving a scar 38 at corner 18 but along inside surface 20 of front panel 4. Since inside surface 20 is not visible from the outside of computer housing 2, scar 38 is likewise not readily visible. In addition, unlike conventional frangible tabs which would extend from wall 10 into opening 8 and thus leave ragged scar material along wall 10, wall 10 is free of such scar material with the present invention. Accordingly, no cleaning up or trimming operations need be performed after breakout panel 6 has been removed.

Modification and variation can be made to the disclosed embodiment without departing from the subject of the invention as defined in the following claims. Breakout panel 6 could be made to fill only part of opening 8. Also, opening 8 need not be a fully enclosed opening but could be defined by, for example, a U-shaped wall 10. Although corner 16 of breakout panel 6 is carried by rim 14, panel 6 need not include such a rim. Preferably panels 4, 6 define the zero landing intersection edge along line of intersection 21; however, panels 4, 6 could be made to leave a gap or space between them if a complete effective seal of opening 8 by breakout panel 6 is not required. Also, the molded part could include the zero landed intersecting edge but also frangible connecting pads extending from wall 10 defining opening 8. The invention is usable with molded parts other than computer housing 2.

What is claimed is:

1. An improved molded part of the type including a body and a breakout element, the body having first and second surfaces and a third surface extending between the first and second surfaces, the third surface defining a breakout opening within which the element is generally situated, the improvement comprising:
   the element having a first region;
   the body having a second region;
   the first and second regions being adjacent one another and defining a line of intersection having no substantial width thereby forming a zero landed intersecting edge; and
   a frangible pad coupling the element and the body, the frangible pad sized to permit the element to be broken away from the body to expose the breakout opening, the frangible pad positioned so that substantially no scar material extends into the breakout opening after removal of the element.

2. The improved part of claim 1 wherein the first and second regions are circumferentially extending regions generally circumscribing the breakout opening.

3. The improved body of claim 1 wherein the second region is adjacent the first surface of the body.

4. The improved part of claim 3 wherein the frangible pad extends along and is coupled to the first surface of the body.

5. The improved part of claim 1 further comprising a plurality of frangible pads.

6. The improved part of claim 1 wherein the first and second regions are corner regions.

7. The improved part of claim 1 wherein the frangible pad adjoins the first surface along the line of intersection.

8. An improved molded part of the type including a body and a breakout element, the body having first and second surfaces and a third surface extending between the first and second surfaces, the third surface defining a breakout opening within which the element is generally situated, the improvement comprising:
   a frangible pad coupling the element and the body, the frangible pad sized to permit the element to be broken away from the body to expose the breakout opening, the frangible pad extending along the first surface of the body so that when the element is removed from the body, any scar on the body from the rupture of the frangible pad is at the first surface whereby the breakout opening is substantially free of scar material.

9. The improved part of claim 8 including a plurality of the frangible pads coupling the element to the body along the first surface proximate to the intersection of the first and third surfaces.

10. An improved molded housing including a body and a breakout element, the body having first and second surfaces and a third surface extending between the first and second surfaces, the third surface defining a breakout opening within which the element is generally situated, the improvement comprising:
    the element having a first circumferentially extending corner region;
    the body having a second circumferentially extending corner region, the first and second corner regions circumscribing the breakout opening;
    the first and second corner regions being adjacent one another and defining a line of intersection having substantially no width to create a zero landed intersecting edge, the second corner region being adjacent the first surface of the body; and
    a plurality of frangible pads coupling the element and the body, each frangible pad sized to permit the element to be broken away from the body to expose the breakout opening, the frangible pads extending along the first surface of the body so that when the element is removed from the body, any scars on the body from the rupture of the frangible pads are at the first surface to leave the breakout opening substantially free of material from the frangible pads.

11. An improved molded housing including a body having a breakout opening within which a breakout element is generally situated, the improvement comprising:
    said breakout element having a circumferential perimeter;
    said breakout element including a circumferential rib along the circumferential perimeter, said rib extending in a first direction perpendicular to said breakout element and into said housing;
    frangible means for coupling said rib to said body.

12. The improved molded housing of claim 11 wherein said breakout element is positioned so that the outer surfaces of said body and said breakout element are substantially coplanar.

* * * * *